(12) United States Patent
Ganesan et al.

(10) Patent No.: US 12,052,726 B2
(45) Date of Patent: *Jul. 30, 2024

(54) USING A CONFIGURED FEEDBACK RESOURCE FOR FEEDBACK

(71) Applicant: Lenovo (Singapore) PTE. LTD., New Tech Park (SG)

(72) Inventors: Karthikeyan Ganesan, Nauheim (DE); Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 112 days.

This patent is subject to a terminal disclaimer.

(21) Appl. No.: 17/472,469

(22) Filed: Sep. 10, 2021

(65) Prior Publication Data

US 2021/0410126 A1 Dec. 30, 2021

Related U.S. Application Data

(63) Continuation of application No. 16/544,698, filed on Aug. 19, 2019, now Pat. No. 11,122,554.

(51) Int. Cl.
*H04W 4/00* (2018.01)
*H04L 5/14* (2006.01)
*H04W 72/23* (2023.01)

(52) U.S. Cl.
CPC ............... *H04W 72/23* (2023.01); *H04L 5/14* (2013.01)

(58) Field of Classification Search
None
See application file for complete search history.

(56) References Cited

U.S. PATENT DOCUMENTS

| 10,278,207 | B2 | 4/2019 | Lee et al. |
| 10,548,181 | B2 | 1/2020 | Siomina et al. |
| 11,122,554 | B2* | 9/2021 | Ganesan ............... H04L 1/1671 |
| 11,750,335 | B2* | 9/2023 | Lee .................. H04W 72/0473 |
| | | | 370/329 |
| 2016/0095099 | A1 | 3/2016 | Yang et al. |

(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.6.0, Jun. 2019, pp. 1-551.

(Continued)

*Primary Examiner* — Clemence S Han
(74) *Attorney, Agent, or Firm* — Kunzler Bean & Adamson

(57) ABSTRACT

Apparatuses, methods, and systems are disclosed for using a configured feedback resource for feedback. One method includes transmitting, to a device, configuration information on a transmission resource, wherein the configuration information comprises: resource information for a data transmission; a request for feedback; and a configuration message indicating configuration of a feedback resource. The method includes monitoring for feedback from the device on the feedback resource. The method includes transmitting the data transmission after the monitoring for feedback on the feedback resource.

19 Claims, 12 Drawing Sheets

(56) References Cited

U.S. PATENT DOCUMENTS

| | | |
|---|---|---|
| 2017/0099581 A1 | 4/2017 | Yang et al. |
| 2019/0052411 A1 | 2/2019 | Chae |
| 2019/0124653 A1 | 4/2019 | Chae et al. |
| 2020/0112400 A1* | 4/2020 | Lee ................ H04L 5/0055 |
| 2020/0128579 A1 | 4/2020 | Talarico et al. |
| 2020/0162864 A1 | 5/2020 | Lee et al. |
| 2020/0205165 A1* | 6/2020 | Huang ............... H04L 1/1854 |
| 2020/0267597 A1* | 8/2020 | Huang ............... H04W 76/14 |
| 2020/0296661 A1 | 9/2020 | Wu et al. |
| 2020/0305126 A1 | 9/2020 | Li et al. |
| 2020/0337022 A1 | 10/2020 | Chae et al. |
| 2020/0337047 A1 | 10/2020 | Abedini et al. |
| 2020/0351024 A1 | 11/2020 | Baghel et al. |
| 2020/0374861 A1 | 11/2020 | Shilov et al. |
| 2021/0127364 A1* | 4/2021 | Panteleev ........... H04L 1/1819 |
| 2022/0007388 A1* | 1/2022 | Lee .................. H04W 72/21 |
| 2022/0159624 A1* | 5/2022 | Ko .................. H04L 1/1812 |
| 2022/0279504 A1* | 9/2022 | Ko .................. H04W 72/21 |
| 2022/0304001 A1* | 9/2022 | Lee ................ H04W 72/0446 |
| 2022/0361227 A1* | 11/2022 | Lee ................... H04L 1/08 |

OTHER PUBLICATIONS

Intel Corporation, "Feature Lead Summary for NR-V2X AI—7.2.4.1.4 Resource Allocation Mechanism", 3GPP TSG RAN WG1 Meeting #96 R1-1903623, Feb. 25-Mar. 1, 2019, pp. 1-18.

Samsung, "On Physical Layer Procedures for NR V2X", 3GPP TSG RAN WG1 #98 R1-1908481, Aug. 26-30, 2019, pp. 1-20.

OPPO, "Physical layer procedure for NR-V2X sidelink", 3GPP TSG RAN WG1 #97 R1-1906475, May 13-17, 2019, pp. 1-12.

* cited by examiner

800

| SCI TX 802 | GAP 804 | Blank Symb. 806 | SL Data 808 |

| SCI TX 902 | Blank Symb. 904 | SL Data 906 |

FIG. 9

USING A CONFIGURED FEEDBACK RESOURCE FOR FEEDBACK

CROSS REFERENCE TO RELATED APPLICATIONS

This application is a continuation application of U.S. patent application Ser. No. 16/544,698, filed on Aug. 19, 2019, which is incorporated herein by reference in its entirety.

FIELD

The subject matter disclosed herein relates generally to wireless communications and more particularly relates to using a configured feedback resource for feedback.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Candidate Single-subframe Resources ("CSRs"), Common Search Space ("CSS"), Control Resource Set ("CORESET"), Device-to-Device ("D2D"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), Group Leader ("GL"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Intelligent Transportation Systems Application Identifier ("ITS-AID"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Platoon Leader ("PL"), Public Land Mobile Network ("PLMN"), Platoon Member ("PM"), Physical Random Access Channel ("PRACH"), Physical Resource Block ("PRB"), Primary Secondary Cell ("PSCell"), Physical Sidelink Control Channel ("PSCCH"), Physical Sidelink Feedback Channel ("PSFCH"), Provider Service Identifier ("PSID"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sidelink Control Information ("SCI"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Slot Format Indicator ("SL-SFI"), Session Management Function ("SA/IF"), Special Cell ("SpCell"), Single Network Slice Selection Assistance Information ("S-NSSAI"), Shortened TTI ("sTTI"), Semi-Persistent Scheduling ("SPS"), Sidelink RSRP ("S-RSRP"), Synchronization Signal ("SS"), Synchronization Signal Block ("SSB"), Scheduling UE ("SUE"), Supplementary Uplink ("SUL"), Subscriber Permanent Identifier ("SUPI"), Candidate Resource Selection Time Window ("T2"), Tracking Area ("TA"), TA Indicator ("TAI"), Transport Block ("TB"), Transport Block Size ("TB S"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Time to Live ("TTL"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, sidelink communication may be used. In such networks, half duplex sidelink communication may be used and some communications may not be properly received because of the half duplex sidelink communication.

BRIEF SUMMARY

Methods for using a configured feedback resource for feedback are disclosed. Apparatuses and systems also perform the functions of the method. One embodiment of a method includes transmitting, to a device, configuration information on a transmission resource, wherein the configuration information comprises: resource information for a data transmission; a request for feedback; and a configuration message indicating configuration of a feedback resource. In certain embodiments, the method includes monitoring for feedback from the device on the feedback resource. In various embodiments, the method includes transmitting the data transmission after the monitoring for feedback on the feedback resource.

One apparatus for using a configured feedback resource for feedback includes a transmitter that transmits, to a device, configuration information on a transmission resource, wherein the configuration information comprises: resource information for a data transmission; a request for feedback; and a configuration message indicating configuration of a feedback resource. In some embodiments, the apparatus includes a processor that monitors for feedback from the device on the feedback resource. In certain embodiments, the transmitter transmits the data transmission after the monitoring for feedback on the feedback resource.

One embodiment of a method for using a configured feedback resource for feedback includes receiving, at a device, configuration information on a reception resource, wherein the configuration information comprises: resource information for a data transmission; a request for feedback; and a configuration message indicating configuration of a feedback resource. In certain embodiments, the method includes determining whether to transmit feedback on the feedback resource. In some embodiments, the method includes, in response to determining to transmit the feedback on the feedback resource, transmitting the feedback from the device on the feedback resource. In various embodiments, the method includes receiving the data transmission after the feedback resource.

One apparatus for using a configured feedback resource for feedback includes a receiver that receives configuration information on a reception resource, wherein the configuration information comprises: resource information for a data transmission; a request for feedback; and a configuration message indicating configuration of a feedback resource. In certain embodiments, the apparatus includes a processor that determines whether to transmit feedback on the feedback resource. In some embodiments, the apparatus includes a transmitter that, in response to the processor determining to transmit the feedback on the feedback resource, transmits the feedback from the apparatus on the feedback resource. In various embodiments, the receiver receives the data transmission after the feedback resource.

One embodiment of a method for retransmitting data includes receiving, at a device, a data transmission via sidelink transmission. In certain embodiments, the method includes determining whether a half duplex problem exists with the data transmission. In some embodiments, the method includes, in response to determining that the half duplex problem exists with the data transmission, retransmitting the data transmission.

One apparatus for retransmitting data includes a receiver that receives a data transmission via sidelink transmission. In certain embodiments, the apparatus includes a processor that determines whether a half duplex problem exists with the data transmission. In some embodiments, the apparatus includes a transmitter that, in response to determining that the half duplex problem exists with the data transmission, retransmits the data transmission.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a schematic block diagram illustrating a further embodiment of a frame structure;

FIG. 9 is a schematic block diagram illustrating yet another embodiment of a frame structure;

DETAILED DESCRIPTION

Figure 1:
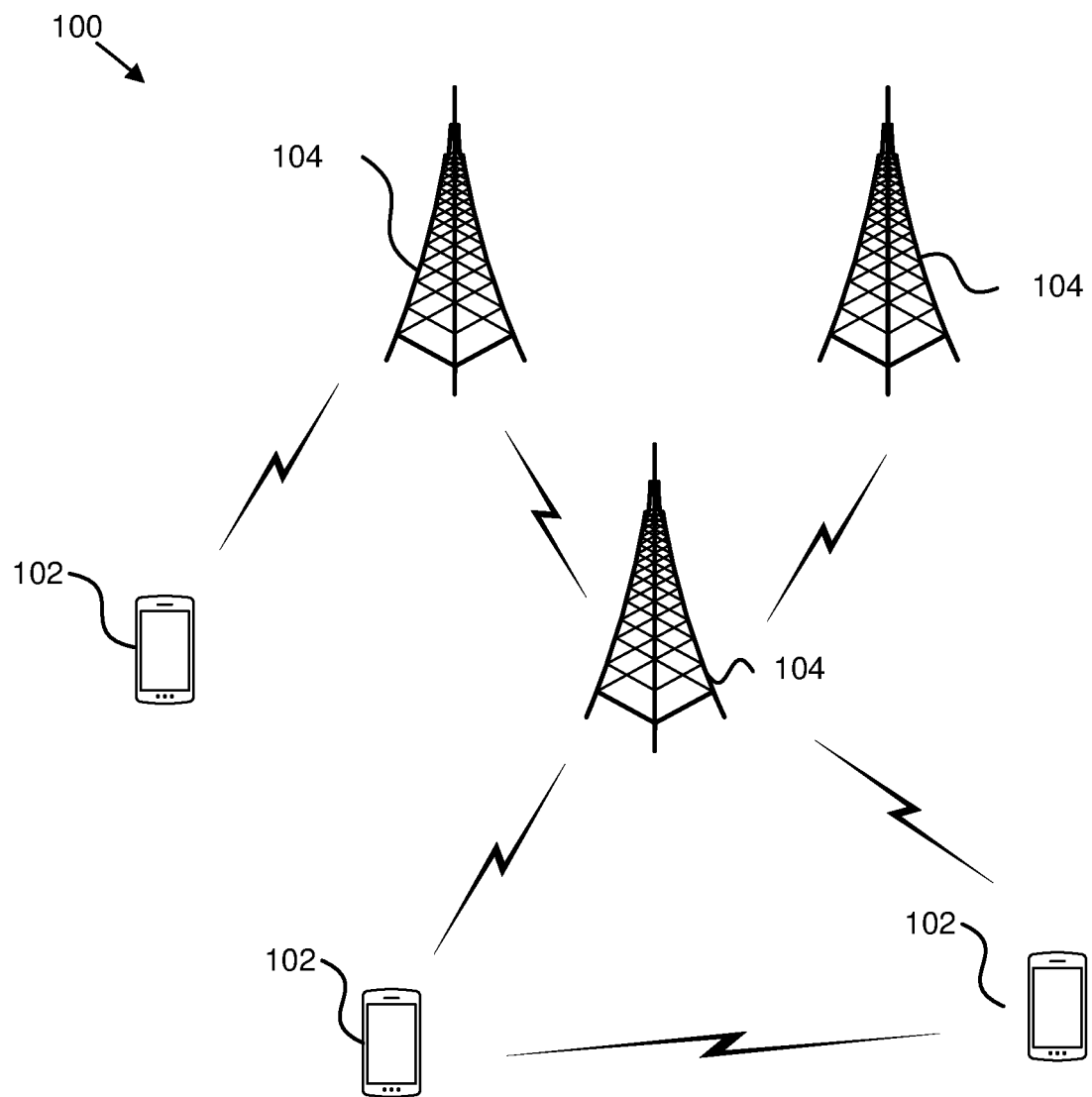
FIG. 1 is a schematic block diagram illustrating one embodiment of a wireless communication system for using a configured feedback resource for feedback.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for using a configured feedback resource for feedback. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may transmit, to a device, configuration information on a transmission resource, wherein the configuration information comprises: resource information for a data transmission; a request for feedback; and a configuration message indicating configuration of a feedback resource. In certain embodiments, the remote unit 102 may monitor for feedback from the device on the feedback resource. In various embodiments, the remote unit 102 may transmit the data transmission after the monitoring for feedback on the feedback resource. Accordingly, the remote unit 102 may be used for using a configured feedback resource for feedback.

In another embodiment, a remote unit 102 may receive, at a device, configuration information on a reception resource, wherein the configuration information comprises: resource information for a data transmission; a request for feedback; and a configuration message indicating configuration of a feedback resource. In certain embodiments, the remote unit 102 may determine whether to transmit feedback on the feedback resource. In some embodiments, the remote unit 102 may, in response to determining to transmit the feedback on the feedback resource, transmit the feedback from the device on the feedback resource. In various embodiments, the remote unit 102 may receive the data transmission after the feedback resource. Accordingly, the remote unit 102 may be used for using a configured feedback resource for feedback.

In one embodiment, a remote unit 102 may receive, at a device, a data transmission via sidelink transmission. In certain embodiments, the remote unit 102 may determine whether a half duplex problem exists with the data transmission. In some embodiments, the remote unit 102 may, in response to determining that the half duplex problem exists with the data transmission, retransmit the data transmission. Accordingly, the remote unit 102 may be used for retransmitting data.

Figure 2:
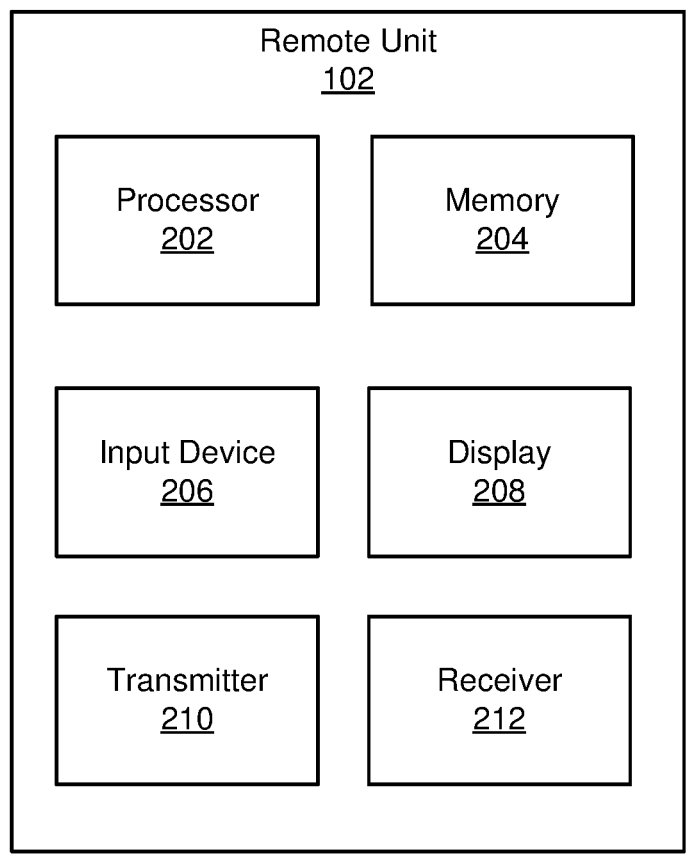
FIG. 2 is a schematic block diagram illustrating one embodiment of an apparatus that may be used for using a configured feedback resource for feedback.

FIG. 2 depicts one embodiment of an apparatus 200 that may be used for using a configured feedback resource for feedback. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 monitors for feedback from the device on the feedback resource. In certain embodiments, the processor 202 determines whether to transmit feedback on the feedback resource. In some embodiments, the processor 202 determines whether a half duplex problem exists with the data transmission. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the transmitter 210: transmits, to a device, configuration information on a transmission resource, wherein the configuration information comprises: resource information for a data transmission; a request for feedback; and a configuration message indicating configuration of a feedback resource; and transmits the data transmission after the monitoring for feedback on the feedback resource.

In various embodiments, the receiver 212 receives configuration information on a reception resource, wherein the configuration information comprises: resource information for a data transmission; a request for feedback; and a configuration message indicating configuration of a feedback resource. In some embodiments, the transmitter 210, in response to the processor determining to transmit the feedback on the feedback resource, transmits the feedback from the apparatus on the feedback resource. In various embodiments, the receiver 212 receives the data transmission after the feedback resource.

In some embodiments, the receiver 212 receives a data transmission via sidelink transmission. In certain embodiments, the transmitter 210, in response to determining that the half duplex problem exists with the data transmission, retransmits the data transmission.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
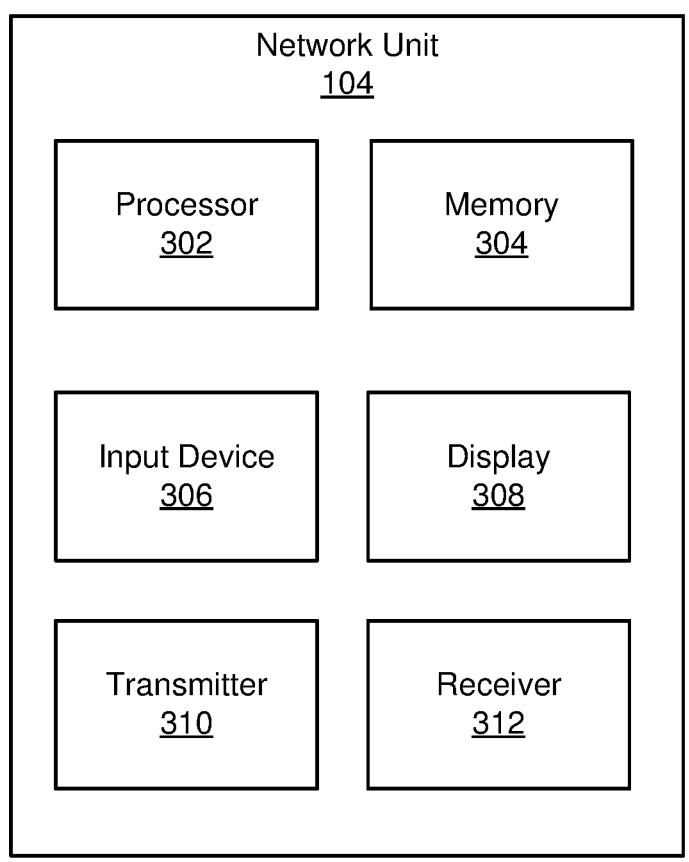
FIG. 3 is a schematic block diagram illustrating one embodiment of an apparatus that may be used for using a configured feedback resource for feedback.

FIG. 3 depicts one embodiment of an apparatus 300 that may be used for using a configured feedback resource for feedback. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit configuration information. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as for distributed resource allocation, half duplex constraints may limit a time at which UEs can transmit to enable all UEs in a group to receive the transmission from the UE. In some embodiments, two UEs may transmit using a same time and/or frequency resource block or timeslot (e.g., with different frequency resource) and the resources may be used for several transmissions via a SPS allocation before a reselection. In such embodiments, several transmissions of the two UEs may have a half duplex problem or resource collision (e.g., if they select the same resource).

Figure 4:
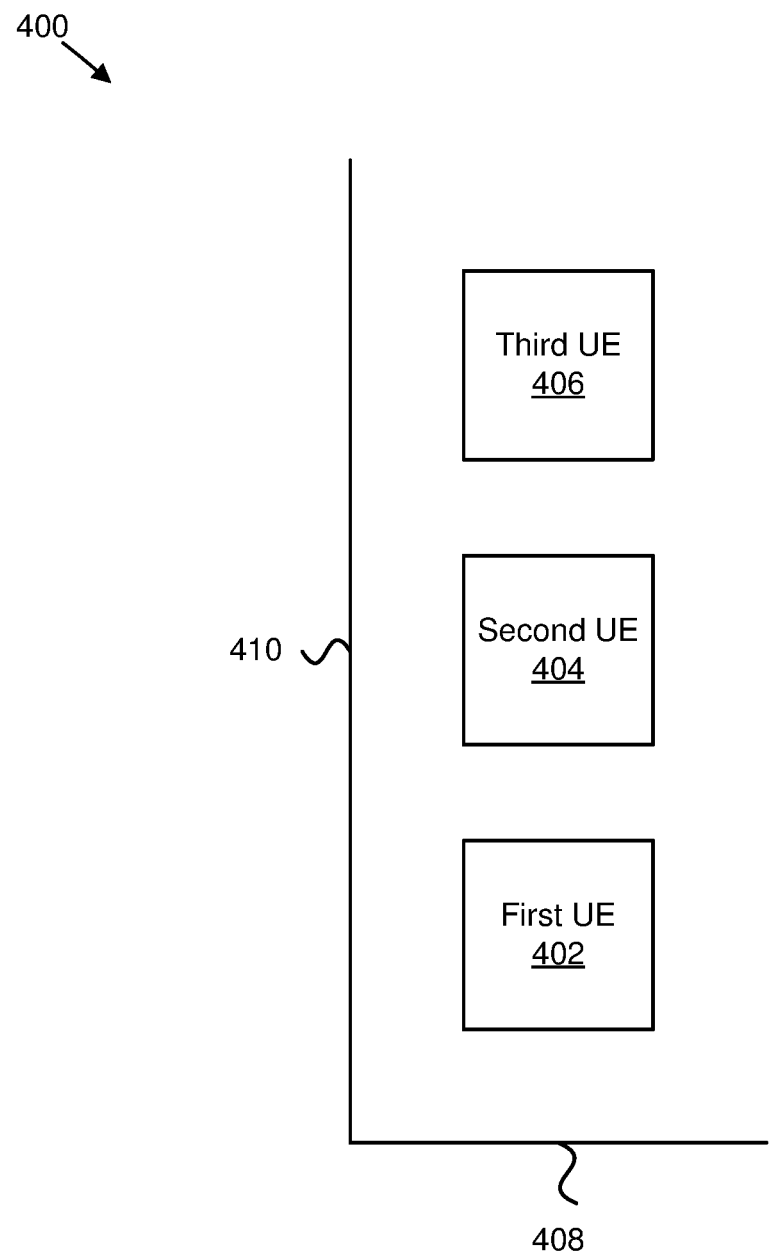
FIG. 4 is a schematic block diagram illustrating one embodiment of a system including multiple UEs transmitting at the same time and different frequencies.

FIG. 4 is a schematic block diagram illustrating one embodiment of a system 400 including multiple UEs transmitting at the same time and different frequencies. The system 400 includes a first UE 402, a second UE 404, and a third UE 406. The first UE 402 and the second UE 404 may transmit data at the same time 408, but on different frequencies 410. Moreover, the third UE 406 may receive both transmissions from the first UE 402 and the second UE 404 because the transmissions are on different frequencies 410. As may be appreciated, if the UEs operate in a half duplex mode, they may not be able to transmit and receive at the same time. Accordingly, while the first UE 402 and the second UE 404 are transmitting data simultaneously, they are not able to receive data (e.g., receive the data transmitted from the other transmitting UE).

In some embodiments, there may be two SL resource allocation modes: Mode 1 in which a BS schedules SL resources to be used by a UE for SL transmissions; and Mode 2 in which a UE determines (e.g., the BS does not schedule) SL transmission resources within SL resources configured by a BS and/or network or preconfigured SL resources.

In certain embodiments, the definition of SL resource allocation Mode 2 covers: a) UE autonomously selects SL resource for transmission; b) UE assists SL resource selection for other UEs, a functionality which can be part of a), c), and/or d); c) UE is configured with NR configured grant (Type-1 like) for SL transmission; and d) UE schedules SL transmissions of other UEs.

In various embodiments, resource allocation Mode 2 supports reservation of SL resources at least for blind retransmission. In one embodiment, sensing and resource selection (or reselection) related procedures may be supported for resource allocation Mode 2.

In some embodiments, a sensing procedure considered may be defined as decoding SCI from other UEs and/or SL measurements. Decoding SCI may provide information on SL resources indicated by a UE transmitting the SCI. The sensing procedure may use a L1 SL RSRP measurement based on SL DMRS if a corresponding SCI is decoded.

In certain embodiments, a resource selection (or reselection) procedure considered may use the results of a sensing procedure to determine resources for SL transmission.

In one embodiment, in Mode 2(a), for SL sensing and resource selection procedures, in the context of a semi-persistent scheme in which resources are selected for multiple transmissions of different TBs and a dynamic scheme in which resources are selected for each TB transmission, the following techniques may be used to identify occupied SL resources: decoding of SL control channel transmissions; SL measurements; and/or detection of SL transmissions. Moreover, the following aspects may be used for SL resource selection: how a UE selects resources for PSCCH and PSSCH transmission (and other SL physical channels and/or signals that are defined); and/or what information is used by the UE for a resource selection procedure.

In some embodiments, for out-of-coverage operation, Mode 2(c) may assume a configuration (or pre-configuration) of single or multiple SL transmission patterns defined on each SL resource pool. In certain embodiments, for in-coverage operation, Mode 2(c) may assume that a gNB configuration indicates single or multiple SL transmission patterns defined on each SL resource pool. In various embodiments, if there is a single pattern configured for a transmitting UE, there may be no sensing procedure executed by the UE if multiple patterns are configured and there may be a possibility of a sensing procedure. As used herein, a "pattern" may be defined by a size and/or position of resources in time and/or frequency, and by a number of resources.

In various embodiments, for Mode 2(d), in the context of group-based SL communication, a UE-A may inform its serving gNB about members UE-B, UE-C, and so on of a group, and the gNB may provide individual resource pool configurations and/or individual resource configurations to each group member through UE-A. In such embodiments, UE-A cannot modify the configurations, and there is no direct connection required between any member UE and the gNB. Moreover, in such embodiments, higher-layer signaling may be the only signaling used to provide the configurations and such functionality may be up to UE capabilities.

In certain embodiments, in the context of Mode-2(d), NR V2X may support the following functionality: a UE informs a gNB about group members and the gNB provides individual resource pool configuration and/or individual resource configuration through the same UE to each group member UE within the same group. This may not require a connection between a member UE and the gNB. The UE may not modify the configuration provided by gNB, higher layer signaling may be used to provide the configuration, and no physical layer signaling may be used; FFS if one or both of the following options are supported—resource pool configurations and/or resource configuration; FFS if functionality is defined as a part of Mode-2 if applicable for this feature; and/or functionality up to UE capabilities.

In certain embodiments, a UE may determine a set of resources to be reported to higher layers for PSSCH transmission if requested by higher layers in subframe n for a carrier according to the following steps: 1) an interval between n+T1 and n+T2 may be a selection window. In this window, CSRs may be selected after filtering out unusable resources. First, a UE marks those subframe resources as unavailable if the UE has been transmitting in those subframes because the subframes at which a UE has transmitted its packet may not be sensed by itself due to half-duplex transmission. Secondly, the UE excludes resources that are probably used by other UEs, whether a resource was used or not may be determined by decoding PSCCH following steps: based on a resource reservation and priority field in an SCI format 1; and/or based on a measured S-RSRP higher than the configured threshold. After excluding resources based on above factors, the remaining resources are called a set SA; and 2) if single-subframe resources in SA are less than 20% of the entire selection window, then more candidate resources should be identified. For this, we raise the RSRP threshold by 3 dB, and repeat the above resource exclusion process. If SA becomes larger than 20%, then we choose those with the smallest RSSI values, which we call SB and report SB to the MAC, where it randomly selects one of them for the transmission. UE selection of T2 value for candidate resource selection may fulfill a latency requirement.

In various embodiments, one embodiment of content of SCI format 1 used to schedule PSSCH is shown in Table 1.

TABLE 1

| | |
|---|---|
| Priority | 3 bits |
| Resource reservation | 4 bits |
| Frequency resource location of initial transmission and retransmission | $\lceil \log_2(N_{subchannel}^{SL}(N_{subchannel}^{SL} + 1)/2) \rceil$ |
| Time gap between initial transmission and retransmission | 4 bits |
| Modulation and coding scheme | 5 bits |
| Retransmission index | 1 bit |
| Transmission format | 1 bit |

It should be noted that as used herein, eNB and/or gNB may be used for a base station but may also be replaceable by any other radio access node (e.g., BS, eNB, gNB, AP, NR, etc). Furthermore, methods described herein may be described mainly in the context of 5G NR, but may be applicable to other mobile communication systems supporting serving cells and/or carriers configured for sidelink communication, such as for systems that communicate over PC5 interface.

Figure 5:
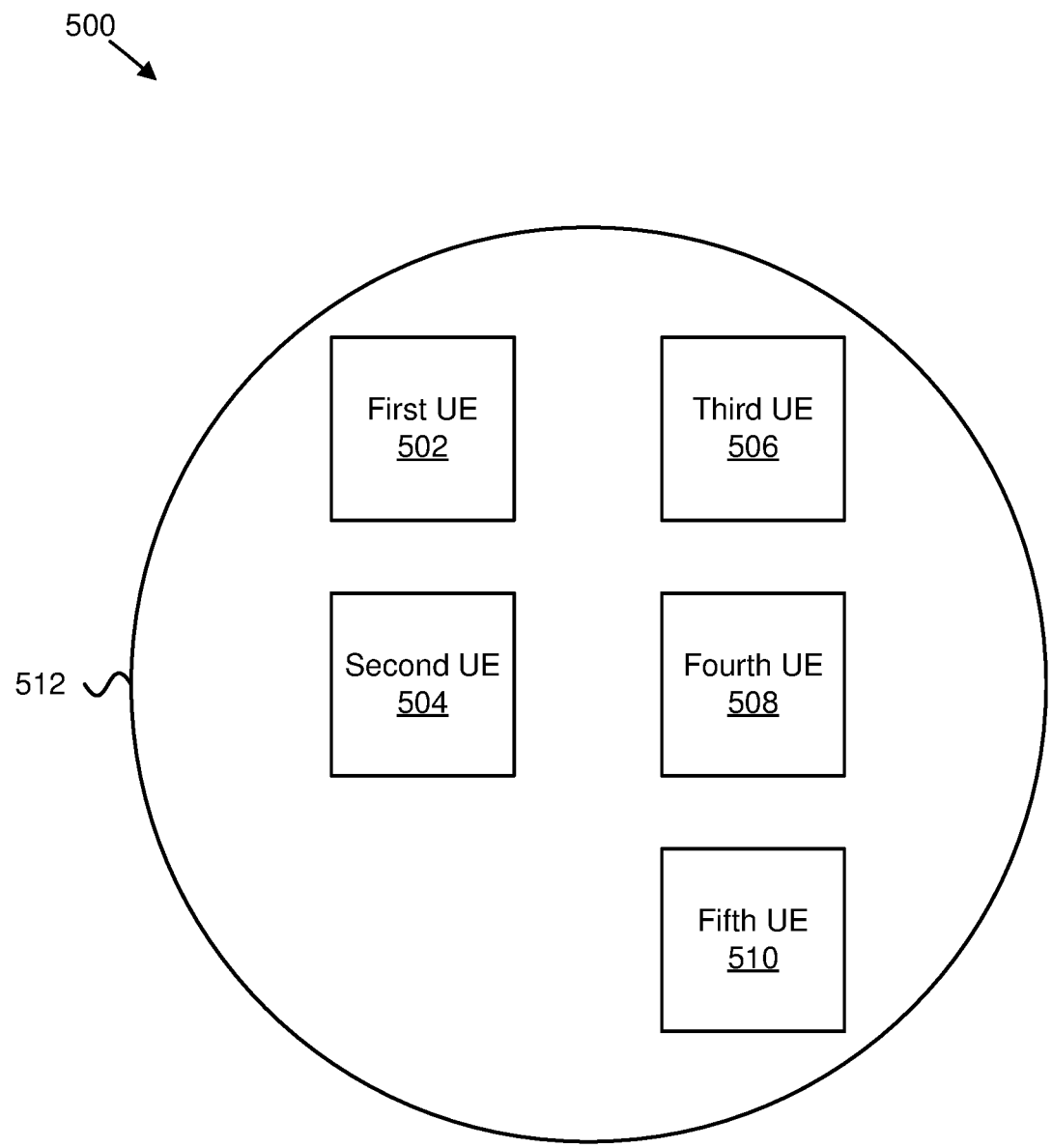
FIG. 5 is a schematic block diagram illustrating one embodiment of a system including multiple UEs transmitting at the same time in the same group.

FIG. 5 is a schematic block diagram illustrating one embodiment of a system 500 including multiple UEs transmitting at the same time in the same group. The system 500 includes a first UE 502, a second UE 504, a third UE 506, a fourth UE 508, and a fifth UE 510 all within a group 512.

Specifically, FIG. 5 illustrates one embodiment of group communication with an NR mode 2 based distributed resource allocation scheme in which the first UE 502 and the second UE 504 transmit using the same time slot (with different frequency resources) and cannot hear each other's transmission and the third UE 506 is a SUE that assists group member with resource selection. The selection of SUE may be configured by a BS or a V2X application, and the UE ID of the SUE may be known to the group members.

In a first embodiment, a reliability issue may arise due to a potential half duplex constraint in a groupcast transmission and may be successfully mitigated with the aid of an SUE that periodically monitors SCI transmissions from group member UEs and provides feedback if there is any potential half duplex problem and/or resource collision.

Figure 6:
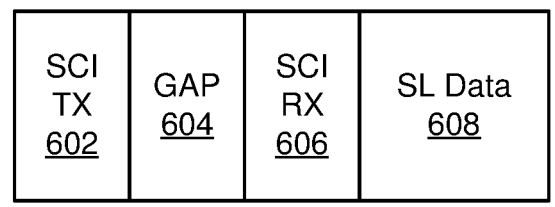
FIG. 6 is a schematic block diagram illustrating one embodiment of a frame structure.

FIG. 6 is a schematic block diagram illustrating one embodiment of a frame structure 600 that may be used to implement the first embodiment. The frame structure 600 illustrated with the time domain extending horizontally includes an SCI TX 602 (e.g., one or more time domain symbols in which configuration information is transmitted, one or more OFDM symbols) transmitted from a TX UE, a gap 604 (e.g., having a gap time period in which there are no UEs transmitting, a set to time domain symbols, a set of OFDM symbols), an SCI RX 606 (e.g., one or more time domain symbol in which feedback is received, one or more OFDM symbols) received by the TX UE, and SL data 608 (e.g., a data transmission transmitted from the TX UE).

Figure 7:
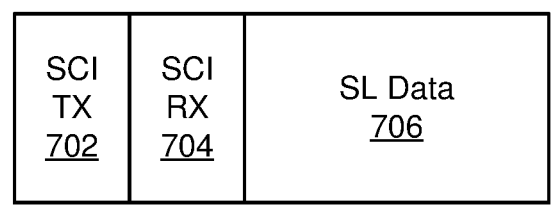
FIG. 7 is a schematic block diagram illustrating another embodiment of a frame structure.

FIG. 7 is a schematic block diagram illustrating another embodiment of a frame structure 700 that may be used to implement the first embodiment. The frame structure 700 illustrated with the time domain extending horizontally includes an SCI TX 702 (e.g., one or more time domain symbols in which configuration information is transmitted, one or more OFDM symbols) transmitted from a TX UE, an SCI RX 704 (e.g., one or more time domain symbol in which feedback is received, one or more OFDM symbols) received by the TX UE, and SL data 706 (e.g., a data transmission transmitted from the TX UE).

FIG. 8 is a schematic block diagram illustrating a further embodiment of a frame structure 800 that may be used to implement the first embodiment. The frame structure 800 illustrated with the time domain extending horizontally includes an SCI TX 802 (e.g., one or more time domain symbols in which configuration information is transmitted, one or more OFDM symbols) transmitted from a TX UE, a gap 804 (e.g., having a gap time period in which there are no UEs transmitting, a set to time domain symbols, a set of OFDM symbols), blank symbols 806 (e.g., blank symb., one or more time domain symbol in which feedback is received, one or more OFDM symbols) configured as symbols in which no transmissions occur from the TX UE, and SL data 808 (e.g., a data transmission transmitted from the TX UE).

FIG. 9 is a schematic block diagram illustrating yet another embodiment of a frame structure 900 that may be used to implement the first embodiment. The frame structure 900 illustrated with the time domain extending horizontally includes an SCI TX 902 (e.g., one or more time domain symbols in which configuration information is transmitted, one or more OFDM symbols) transmitted from a TX UE, blank symbols 904 (e.g., blank symb., one or more time domain symbol in which feedback is received, one or more OFDM symbols) configured as symbols in which no transmissions occur from the TX UE, and SL data 906 (e.g., a data transmission transmitted from the TX UE).

As illustrated in FIGS. 6 and 7, TX UEs may transmit SCI in a beginning part of the OFDM symbols (e.g., SCI TX) to group member UEs. The SCI transmission may contain resource information for a data transmission, a corresponding destination group identifier, a destination node identifier, an indication for requesting feedback from an SUE, a slot format indicator indicating a time domain symbol for feedback, and/or a feedback resource configuration.

In the subsequent OFDM symbols configured as blank symbols as shown in FIGS. 8 and 9 or labeled as SCI RX in FIGS. 6 and 7, the TX UE switches to an RX mode before it transmits SL data. During a time duration of the blank symbols or the SCI RX, the TX UE checks for feedback from an SUE that may indicate whether there is a half duplex problem. The blank symbols are symbols in which TX UEs in a group do not make any transmissions, but instead wait for reception of feedback from an SUE.

Thus, during the blank symbols, TX UEs do not transmit anything, TX UEs are switched to an RX mode, and only the SUE is enabled to transmit feedback during this period. If there is a switching time or gap required then a flexible symbol (or symbols) may be inserted as a gap (e.g., the gap 604, the gap 804) before the blank symbols.

In some embodiments, TX UEs, if configured for half duplex detection, may select transmission resources from transmit resource pools. The selection may be based on the reliability and/or latency requirement of a groupcast packet transmission.

In certain embodiments, TX UEs may indicate configuration information for a feedback transmission that will be transmitted by an SUE. The indication of the configuration information may be made dynamically in SCI, semi-statically in PC5 RRC, and/or by a gNB via RRC. One embodiment of configuration information is shown in Table 2. In various embodiments, the configuration information includes: a flag to indicate a request for half duplex detection, a time domain symbol for transmission of the feedback message by the SUE, a feedback timing, a feedback resource, an offset for the transmission of the feedback message by the SUE, a resource option to be used by the SUE (e.g., a common feedback resource, a dedicated feedback resource), a number of blank symbols, and/or a number of OFDM symbols that create a switching gap.

TABLE 2

Configuration Message

| | |
|---|---|
| Request for half duplex detection | 1 bit |
| Feedback timing and resource | Xx bits |
| Common feedback or dedicated feedback | Xx bits |
| Blank symbol(s) | Xx bits |
| Switching gap | Xx bits |

In various embodiments, TX UEs receive feedback (e.g., a feedback indicator, a feedback message) and/or additional scheduling assistance information from an SUE as shown in Table 3 in response to transmitting SCI. In such embodiments, the TX UEs may transmit based on the scheduling assistance information provided in the feedback message by the SUE that may be based on a random back off timer. Table 3 shows one embodiment of a feedback message that include a half duplex detection indicator, and instructions for a TX UE with an identified source ID to transmit on a particular time slot or using an indicated offset. As may be appreciated, the feedback message may include information for two or more TX UEs that desire to transmit information at the during the same time resources in order to assign the TX UEs different time resources so that their transmissions do not occur at the same time.

TABLE 3

Feedback Message

| | |
|---|---|
| Half duplex detection | 1 bit |
| Source ID of TX UE | XX bits |
| Transmit time slot or offset | XX bits |
| Source ID of TX UE | XX bits |
| Transmit time slot or offset | XX bits |

In some embodiments, if a TX UE transmits a message requesting feedback from an SUE corresponding to half duplex detection and the TX UE does not detect a feedback message that includes the feedback during a configured time period, the TX UE may based on its own remaining packet delay budget and/or priority determine to transmit the SL data in the same time slot that it originally planned to or transmit the SL data in a different time slot based on a random back off timer.

In certain embodiments, if a TX UE transmits a message requesting feedback from an SUE corresponding to half duplex detection and the TX UE receives on a common feedback resource, then, if the common feedback resource indicates detection of a half duplex problem, the TX UE may transmit SL data after a random back off timer.

In various embodiments, one RX UE may be configured as an SUE. In such embodiments, the SUE may monitor SCI transmission from multiple TX UEs in a group, the SUE may periodically monitor, receive, and/or decode SCI transmitted from group member UEs in a configured resources as part of a sensing procedure, the SUE may transmit feedback in configured blank symbols to the TX UEs about a half duplex problem detection and/or resource collision. In some embodiments, if an SUE receives one or more SCI transmission from group member UEs in the same or different OFDM symbols of a time slot, the SUE may check one or more destination group identifiers and/or a resource selected for SL data transmission by group member UEs from their SCI.

In certain embodiments, if a destination group identifier indicated by group member TX UEs is identical and/or a resource selected by the group member TX UEs occupies the same time slot, then there is a potential half duplex problem and an SUE may provide feedback with a corresponding indication to the TX UEs.

In various embodiments, if a destination group identifier indicated by group member TX UEs is not identical and/or a resource selected by the group member TX UEs do not occupy the same time slot, then there is no half duplex problem and an SUE may provide feedback to the TX UEs that indicates that there is no half duplex problem.

In some embodiments, if a destination group identifier indicated by group member TX UEs is not identical and/or a resource selected by the group member TX UEs occupies the same time slot, then there is a potential half duplex problem and an SUE may (or may not) provide feedback with a corresponding indication to the TX UEs.

In certain embodiments, an SUE, based on a received feedback configuration from TX UEs, may select a resource based on a corresponding feedback option and may transmit feedback in a common feedback resource and/or a dedicated feedback resource to TX UEs based on a number of TX UEs transmitting in a time slot. The number of TX UEs transmitting in a time slot may be determined based on SCI reception.

In various embodiments, an SUE may be configured to transmit feedback only if there is a half duplex problem detected and may provide no feedback transmission if there is no half duplex problem detected.

In some embodiments, a feedback transmission (e.g., feedback message) transmitted from an SUE may be carried by a PSCCH in the SCI RX shown in FIGS. 6 and 7 or in the blank symbols shown in FIGS. 8 and 9. Table 3 shows one embodiment of information that may be included in a feedback message. For example, the feedback message may include: an indicator based on a flag or a bit that provides feedback information (e.g., '0' for no half duplex problem and '1' for half duplex problem detection); and or source IDs of TX UEs for each TX UE or group IDs if a common feedback resource is used.

In certain embodiments, an SUE may provide additional assistance information such as different time slots or OFDM symbols configuration to TX UEs to facilitate avoiding a problem in the same or subsequent transmissions. In one embodiment, based on a priority indicated by TX UEs in SCI, an SUE that detects a half duplex problem may provide feedback to one TX UE to transmit in an originally planned time slot and/or symbols and may provide feedback to another TX UE to transmit in a different non-overlapping time slot and/or symbols.

In various embodiments, a BS may configure separate resource pools with blank symbols as described in relation to FIGS. 8 and 9. In such embodiments, the BS may broadcast the configuration of the resource pools as part of a system information block and/or the configuration may be configured (or preconfigured) for NR Mode 2 operations. In such embodiments, the configuration of the resource pools by the gNB or the otherwise provided configuration (or preconfiguration) may contain an indication of one or more time domain symbols for: SCI transmission, blank symbols, SL data transmission, and/or sidelink HARQ feedback.

In some embodiments, configuration of a sidelink frame structure indicating blank symbols may be indicated by: a SL-SFI by a gNB in DCI (e.g., format 5A), a system information block for sidelink, an RRC configuration for sidelink, and/or other sidelink UEs either in SCI or PC5 RRC. As may be appreciated, configured blank symbols may be for a group of UEs in a cell or for certain geographical areas. In certain embodiments, flexible symbols may be explicitly configured as blank symbols. As may be appreciated, a flexible symbol may be an OFDM symbol in a slot that may be configured as DL, UL, SL, and/or a blank symbol. In various embodiments, a configuration that enables half duplex detection may be configured by a BS.

Figure 10A:
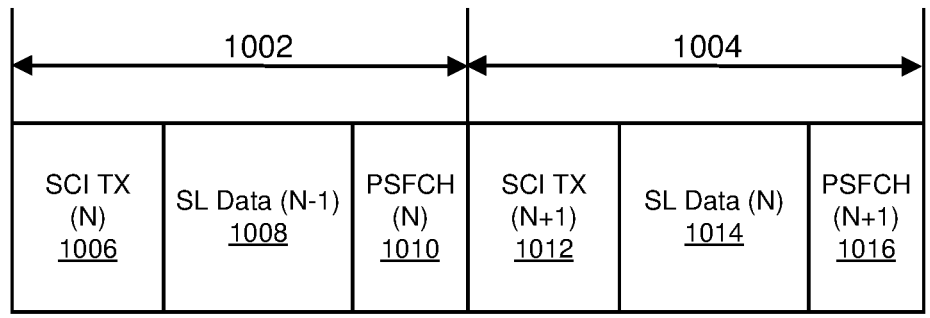
FIG. 10A is a schematic block diagram illustrating an additional embodiment of a frame structure.

While FIGS. 6, 7, 8, and 9 illustrate certain examples of frames structures used to implement the first embodiment, other frame structures may also be used. For example, FIG. 10A is a schematic block diagram illustrating an additional embodiment of a frame structure 1000 that may be used to implement the first embodiment.

The frame structure 1000 is illustrated with the time domain extending horizontally and includes a first slot (N) 1002 and a second slot (N+1) 1004. The first slot (N) 1002 includes an SCI TX (N) 1006 (e.g., one or more time domain symbols in which configuration information is transmitted in slot N, one or more OFDM symbols transmitted in slot N) transmitted from a TX UE, SL Data (N−1) 1008 (e.g., a data transmission transmitted from the TX UE that corresponds to configuration information transmitted in slot N−1—the slot that would precede the first slot (N) 1002), and PSFCH (N) 1010 (e.g., one or more time domain symbol in which feedback is received that corresponds to SCI TX (N) 1006, one or more OFDM symbols in which feedback is received that corresponds to SCI TX (N) 1006). The second slot (N+1) 1004 includes an SCI TX (N+1) 1012 (e.g., one or more time domain symbols in which configuration information is transmitted in slot N+1, one or more OFDM symbols transmitted in slot N+1) transmitted from a TX UE, SL Data (N) 1014 (e.g., a data transmission transmitted from the TX UE that corresponds to configuration information transmitted in the first slot (N) 1002), and PSFCH (N+1) 1016 (e.g., one or more time domain symbol in which feedback is received that corresponds to SCI TX (N+1) 1012, one or more OFDM symbols in which feedback is received that corresponds to SCI TX (N+1) 1012). As may be appreciated, based on the feedback provided in PSFCH (N) 1010, the TX UE may determine whether to transmit the SL data (N) 1014 in the second slot (N+1) 1004. In another method, the feedback may be transmitted for the SL data (N) with PSFCH in the same time slot as illustrated in FIG. 10B.

Figure 10B:
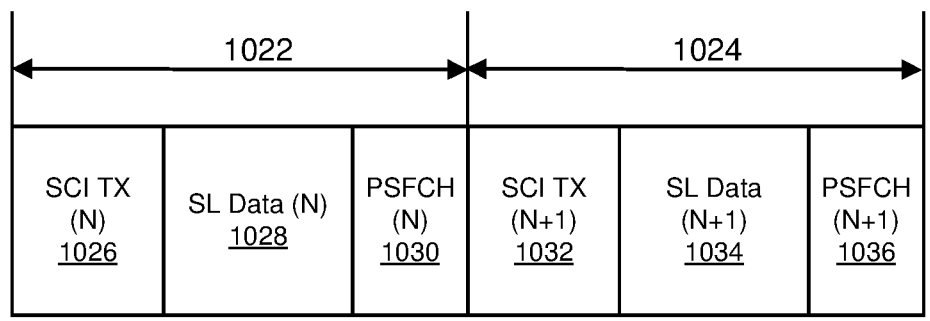
FIG. 10B is a schematic block diagram illustrating another embodiment of a frame structure.

FIG. 10B is a schematic block diagram illustrating another embodiment of a frame structure 1020 that may be used to implement the first embodiment.

The frame structure 1020 is illustrated with the time domain extending horizontally and includes a first slot (N) 1022 and a second slot (N+1) 1024. The first slot (N) 1022 includes an SCI TX (N) 1026 (e.g., one or more time domain symbols in which configuration information is transmitted in the first slot (N) 1022, one or more OFDM symbols transmitted in the first slot (N) 1022) transmitted from a TX UE, SL Data (N) 1028 (e.g., a data transmission transmitted from the TX UE that corresponds to configuration information transmitted in the first slot (N) 1022), and PSFCH (N) 1030 (e.g., one or more time domain symbol in which feedback is received that corresponds to SCI TX (N) 1026, one or more OFDM symbols in which feedback is received that corresponds to SCI TX (N) 1026). The second slot (N+1) 1024 includes an SCI TX (N+1) 1032 (e.g., one or more time domain symbols in which configuration information is transmitted in the second slot (N+1) 1024, one or more OFDM symbols transmitted in the second slot (N+1) 1024) transmitted from a TX UE, SL Data (N+1) 1034 (e.g., a data transmission transmitted from the TX UE that corresponds to configuration information transmitted in the second slot (N+1) 1024), and PSFCH (N+1) 1036 (e.g., one or more time domain symbol in which feedback is received that corresponds to SCI TX (N+1) 1032, one or more OFDM symbols in which feedback is received that corresponds to SCI TX (N+1) 1032).

Figure 11:
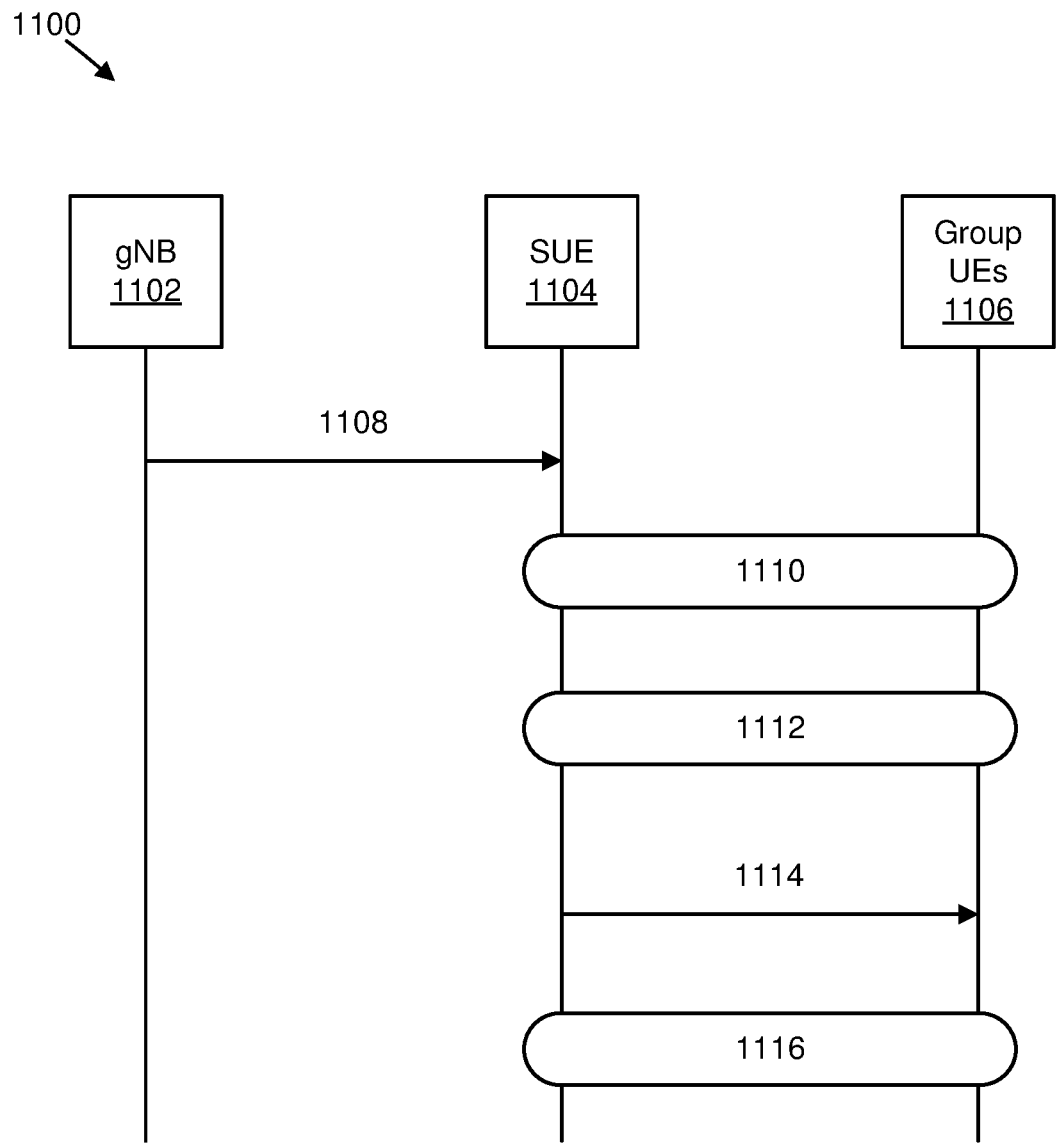
FIG. 11 is a schematic block diagram illustrating one embodiment of communications corresponding to group transmissions.

FIG. 11 is a schematic block diagram illustrating one embodiment of communications 1100 corresponding to group transmissions. The communications 1100 may include communications between a gNB 1102, an SUE 1104, and group UEs 1106. As may be appreciated, descriptions of communications contained herein may refer to one or more messages transmitted between devices.

In one embodiment, in a first communication 1108 transmitted from the gNB 1102 to the SUE 1104, the gNB 1102 may transmit a configuration message to the SUE 1104 to indicate a configuration for SCI and/or a feedback message. In some embodiments, in a second communication 1110 transmitted between the SUE 1104 and the group UEs 1106, the configuration message may be provided from the SUE 1104 to the group UEs 1106. In certain embodiments, in a third communication 1112 transmitted between the group UEs 1106 and the SUE 1104, one or more of the group UEs 1106 may transmit SCI for groupcast data. In various embodiments, in a fourth communication 1114 transmitted from the SUE 1104 to the group UEs 1106, the SUE 1104 may provide a feedback message corresponding to the SCI to the group UEs 1106 (e.g., to the TX UEs). In some embodiments, in a fifth communication 1116 transmitted between the group UEs 1106 and the SUE 1104, groupcast data may be transmitted by one or more TX UEs of the group UEs 1106.

In a second embodiment, a feedback message may be sent by any UE in a UE group (e.g., not just an SUE). In some cases, a gNB may configure a threshold based on an L1 sidelink RSRP or a configured (or preconfigured) threshold, and a feedback transmission may be transmitted by UEs that are above the configured threshold.

The feedback message may be sent using dedicated L1 signaling to indicate half duplex detection to TX UEs. In one embodiment, the L1 signaling may use PSFCH or PSCCH (e.g., SCI) transmission resources. In certain embodiments, feedback resource configuration may be transmitted by a gNB and/or an SUE. In various embodiments, if PSFCH is used, a common or dedicated feedback configuration may be used.

In some embodiments, if a group member UE detects a half duplex problem as one or more TX UEs are transmitting in the same time slot, even if SL data (e.g., PSSCH) is successfully decoded, the group member UEs may transmit one or more NACKs in a common or dedicated feedback resource to implicitly indicate a potential half duplex problem and the one or more TX UEs may transmit (or retransmit) a corresponding transport block based on the feedback.

In a third embodiment, an RX UE configured as a SUE may: monitor SCI transmissions from multiple TX UEs from a group, receive and/or decode SCI transmitted from group member UEs in configured resources as part of a sensing procedure, and transmit (or retransmit) a group packet to the TX UEs if a half duplex problem is detected and/or a resource collision is detected. Thus, the SUE may directly retransmit the simultaneously transmitted data so that TX UEs do not have to schedule retransmission of the data as in other embodiments. For the transmission (or retransmission), the SUE may use a source ID of the TX UEs as found in L1 and/or L2 signaling.

In certain embodiments, a TX UE may indicate in SCI about a request for half duplex detection and transmission (or retransmission) by an SUE. The TX UEs may reserve a time slot and/or resource for transmission (or retransmission) by the SUE and may indicate the reservation in SCI.

In a fourth embodiment, a sensing method for selecting candidate resources may be improved based on TX UEs receiving feedback messages for half duplex detection. For example, in a resource exclusion process, if a requested or configured feedback message successfully indicates to one or more TX UEs that there is no half duplex problem, then the candidate resources for that time slot (e.g., the time slot in which feedback is requested) is included in the candidate resource selection process.

In some embodiments, if a feedback message indicates a half duplex problem, then there may be a potential transmission from other member UEs in the same time slot, however candidate resource selection process may also depend on a potential resource collision detection with the same or overlapping frequency resources. A determination of whether the resources selected by two or more TX UEs collide (or not) may be based on assistance signaling either from group member UEs or an SUE using L1 signaling, such as PSCCH or PSFCH.

Figure 12:
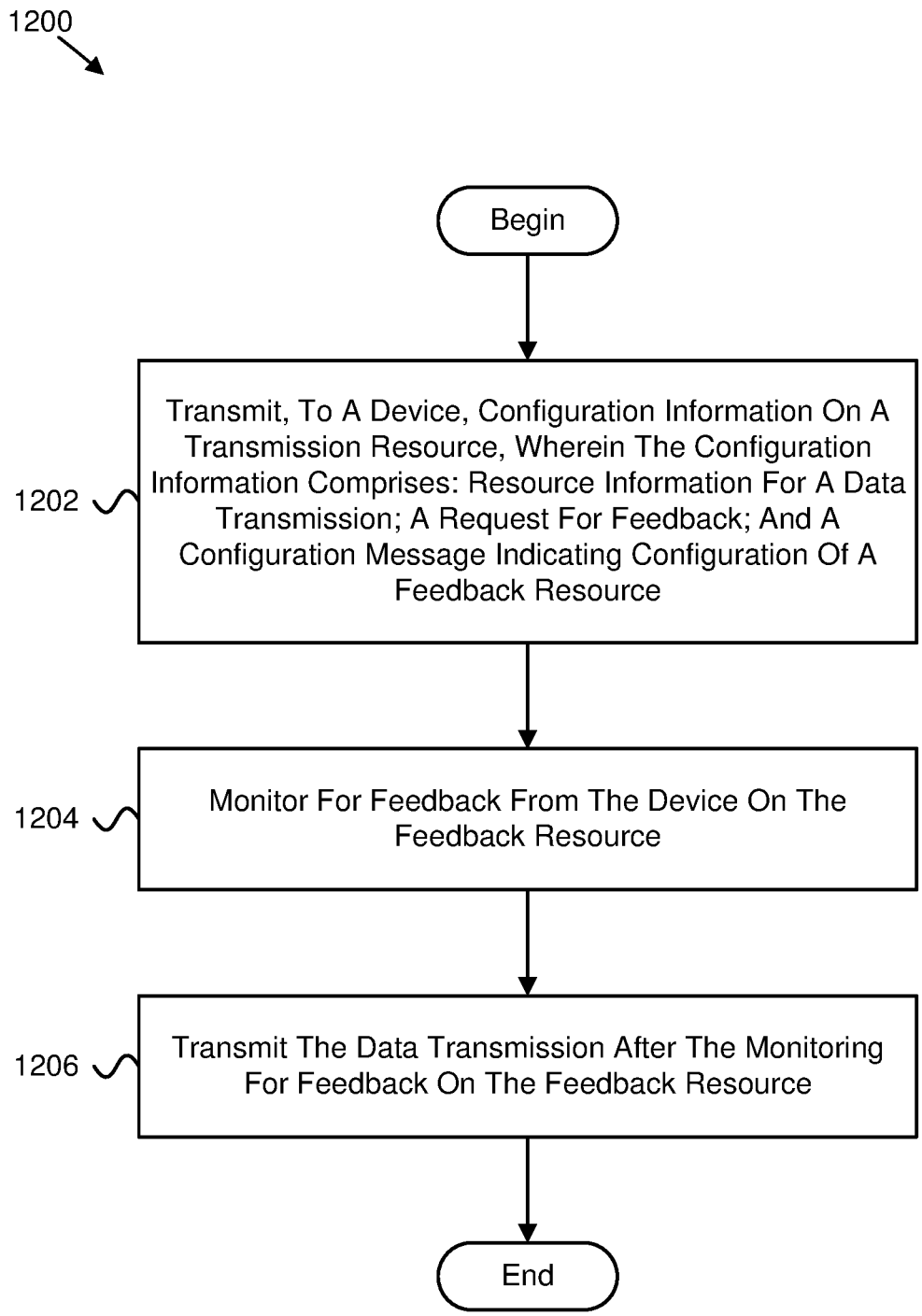
FIG. 12 is a flow chart diagram illustrating one embodiment of a method for using a configured feedback resource for feedback.

FIG. 12 is a flow chart diagram illustrating one embodiment of a method 1200 for using a configured feedback resource for feedback. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include transmitting 1202, to a device, configuration information on a transmission resource, wherein the configuration information comprises: resource information for a data transmission; a request for feedback; and a configuration message indicating configuration of a feedback resource. In certain embodiments, the method 1200 includes monitoring 1204 for feedback from the device on the feedback resource. In various embodiments, the method 1200 includes transmitting 1206 the data transmission after the monitoring for feedback on the feedback resource.

In certain embodiments, a gap time period in terms of time domain symbols occurs between a time domain symbol in which the configuration information is transmitted and a time domain symbol in which the feedback is received. In some embodiments, the feedback resource is received in a time domain symbol directly after a time domain symbol in which the configuration information is transmitted. In various embodiments, the feedback indicates whether there is a half duplex problem detection, a resource collision, or a combination thereof.

In one embodiment, the configuration of the feedback resource comprises information indicating a time domain symbol for the feedback. In certain embodiments, the feedback resource comprises orthogonal frequency division multiplexed symbols configured as blank symbols. In some embodiments, no transmissions are made on the blank symbol except the feedback transmission made by the device.

In various embodiments, the method 1200 further comprises selecting the transmission resource and the feedback resource from a resource pool. In one embodiment, transmitting the configuration information comprises transmitting the configuration information within sidelink control information, transmitting the configuration information using a radio resource control message, receiving the configuration message as part of downlink control information, receiving the configuration message as part of radio resource control information, or some combination thereof. In certain embodiments, the feedback resource comprises a common feedback resource or a dedicated feedback resource.

In some embodiments, the configuration information comprises an indication of a half duplex problem detection. In various embodiments, transmitting the data transmission comprises transmitting the data transmission based on the feedback corresponding to a half duplex problem detection. In one embodiment, transmitting the data transmission based on the feedback corresponding to the half duplex problem detection comprises transmitting the data transmission based on an indicated time slot in a feedback message or based on a random back off timer.

In certain embodiments, the method 1200 further comprises, in response to monitoring for the feedback on the feedback resource resulting in not detecting the feedback, transmitting the data transmission based on a random back off timer, a remaining packet delay budget, a priority, or a combination thereof. In some embodiments, transmitting the data transmission based on the random back off timer, the remaining packet delay budget, the priority, or the combination thereof comprises transmitting the data transmission in a prior determined time slot, or transmitting the data transmission in a time slot determined based on a random back off timer. In various embodiments, the device comprises a scheduling user equipment, and the scheduling user equipment belongs to a destination group.

In one embodiment, the device comprises one or more non-scheduling user equipments. In certain embodiments, the data transmission occurs in a slot after the transmission resource and the feedback resource. In some embodiments, the feedback resource is used to carry a negative acknowledgment that indicates detection of a potential half duplex problem.

In various embodiments, the feedback indicates that there is not a half duplex problem detected. In one embodiment, the method 1200 further comprises transmitting a second data transmission on a second feedback resource.

Figure 13:
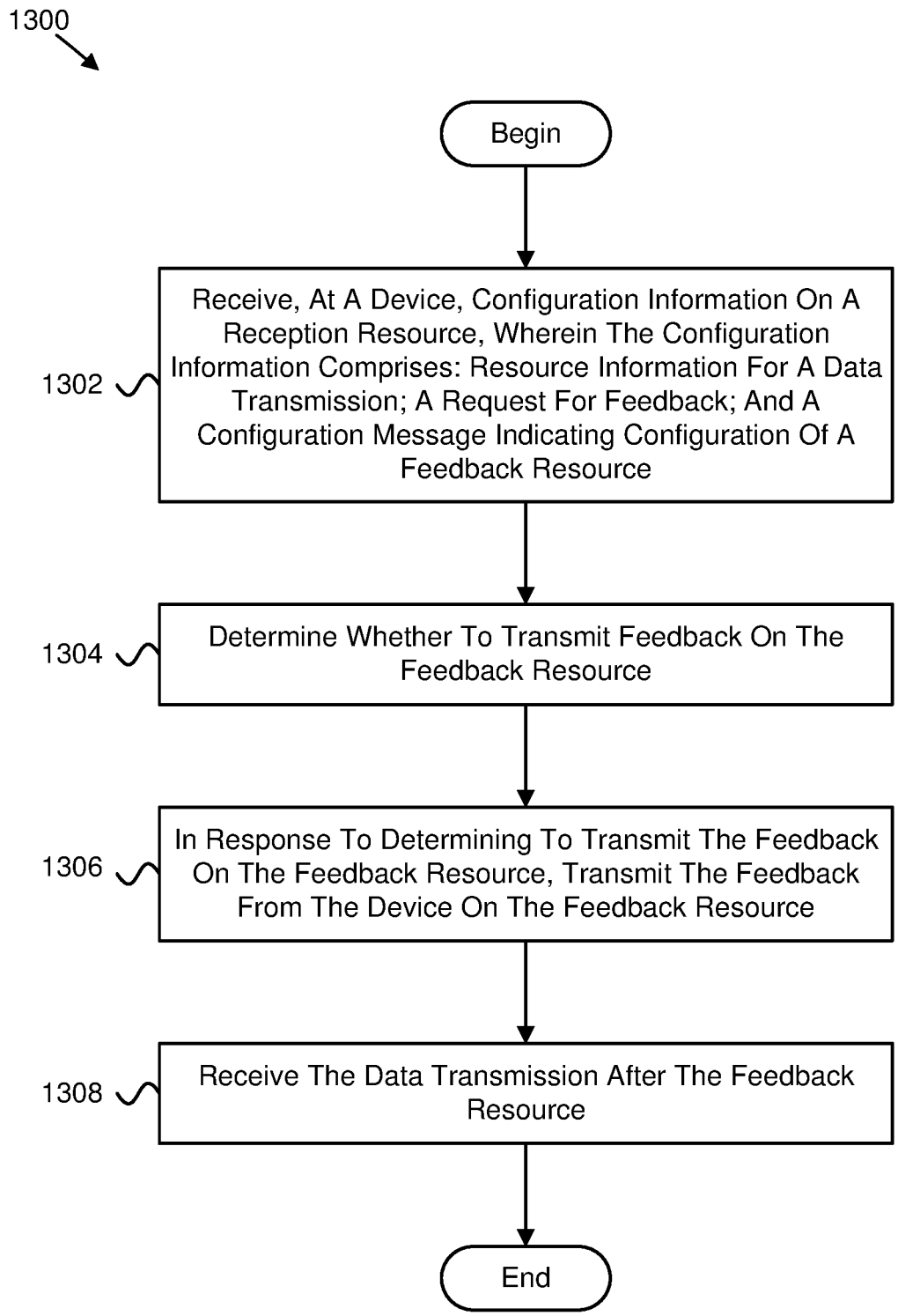
FIG. 13 is a flow chart diagram illustrating another embodiment of a method for using a configured feedback resource for feedback.

FIG. 13 is a flow chart diagram illustrating another embodiment of a method 1300 for using a configured feedback resource for feedback. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include receiving 1302, at a device, configuration information on a reception resource, wherein the configuration information comprises: resource information for a data transmission; a request for feedback; and a configuration message indicating configuration of a feedback resource. In certain embodiments, the method 1300 includes determining 1304 whether to transmit feedback on the feedback resource. In some embodiments, the method 1300 includes, in response to determining to transmit the feedback on the feedback resource, transmitting 1306 the feedback from the device on the feedback resource. In various embodiments, the method 1300 includes receiving 1308 the data transmission after the feedback resource.

In certain embodiments, a gap time period in terms of time domain symbols occurs between a time domain symbol in which the configuration information is transmitted and a time domain symbol in which the feedback is received. In some embodiments, the feedback resource is received in a time domain symbol directly after a time domain symbol in which the configuration information is transmitted. In various embodiments, the feedback indicates whether there is a half duplex problem detection, a resource collision, or a combination thereof.

In one embodiment, the configuration of the feedback resource comprises information indicating a time domain symbol for the feedback. In certain embodiments, the feedback resource comprises orthogonal frequency division multiplexed symbols configured as blank symbols. In some embodiments, no transmissions are made on the blank symbol except the feedback transmission made by the device.

In various embodiments, the transmission resource and the feedback resource are selected from a resource pool. In one embodiment, receiving the configuration information comprises receiving the configuration information within sidelink control information, receiving the configuration information using a radio resource control message, receiving the configuration message as part of downlink control information, receiving the configuration message as part of radio resource control information, or some combination thereof. In certain embodiments, the feedback resource comprises a common feedback resource or a dedicated feedback resource.

In some embodiments, the configuration information comprises an indication of a half duplex problem detection. In various embodiments, receiving the data transmission comprises receiving the data transmission based on the feedback corresponding to a half duplex problem detection. In one embodiment, receiving the data transmission based on the feedback corresponding to the half duplex problem detection comprises receiving the data transmission based on an indicated time slot in a feedback message or based on a random back off timer.

In certain embodiments, the method 1300 further comprises, in response to determining not to transmit the feedback on the feedback resource, receiving the data transmission based on a random back off timer, a remaining packet delay budget, a priority, or a combination thereof. In some embodiments, receiving the data transmission based on the random back off timer, the remaining packet delay budget, the priority, or the combination thereof comprises receiving the data transmission in a prior determined time slot, or receiving the data transmission in a time slot determined based on a random back off timer. In various embodiments, the device comprises a scheduling user equipment, and the scheduling user equipment belongs to a destination group.

In one embodiment, the device comprises one or more non-scheduling user equipments. In certain embodiments, the data transmission occurs in a slot after the transmission resource and the feedback resource. In some embodiments, the feedback resource is used to carry a negative acknowledgment that indicates detection of a potential half duplex problem.

Figure 14:
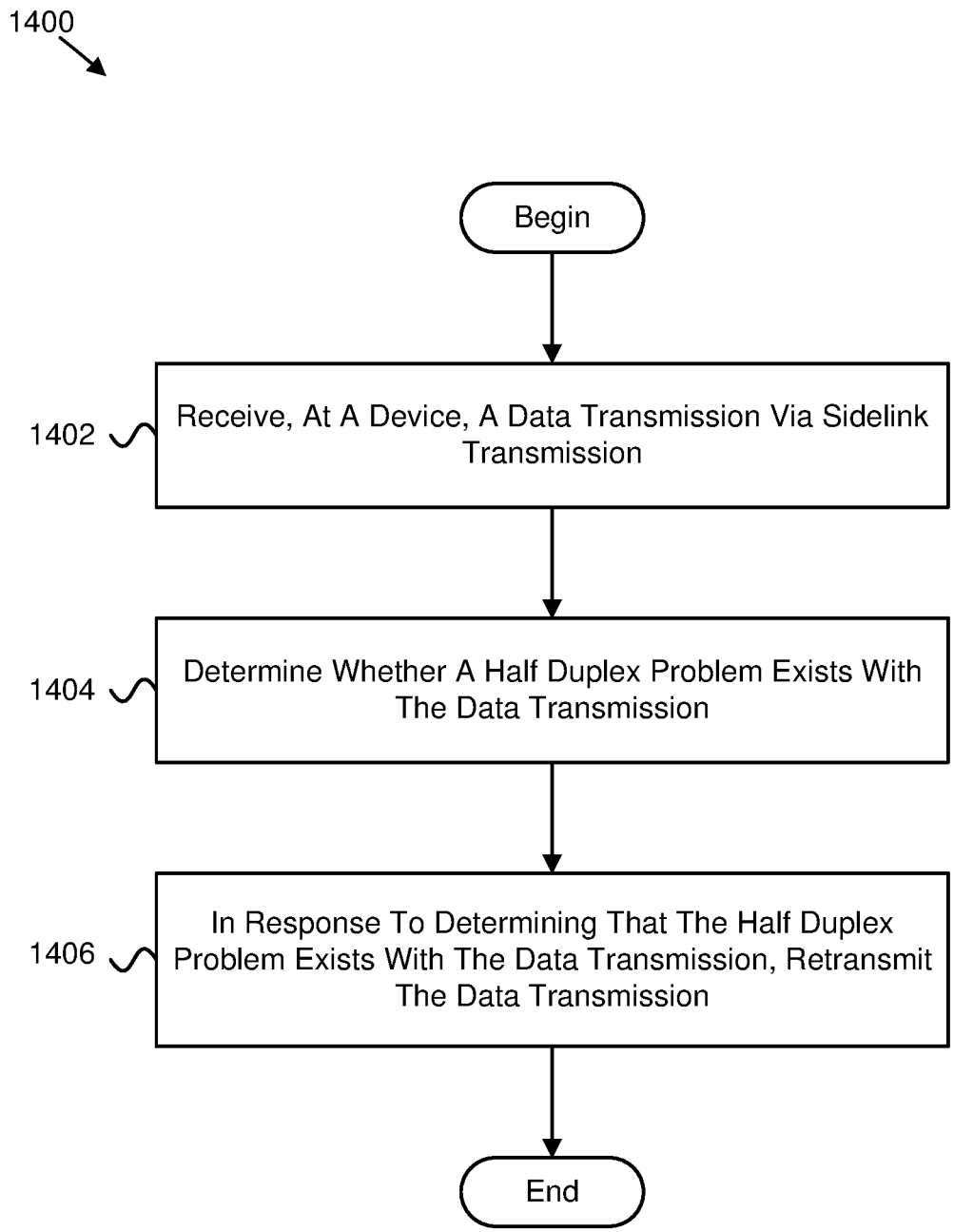
FIG. 14 is a flow chart diagram illustrating one embodiment of a method for retransmitting data.

FIG. 14 is a flow chart diagram illustrating one embodiment of a method 1400 for retransmitting data. In some embodiments, the method 1400 is performed by an apparatus, such as the remote unit 102. In certain embodiments, the method 1400 may be performed by a processor executing program code, for example, a microcontroller, a microprocessor, a CPU, a GPU, an auxiliary processing unit, a FPGA, or the like.

The method 1400 may include receiving 1402, at a device, a data transmission via sidelink transmission. In certain embodiments, the method 1400 includes determining 1404 whether a half duplex problem exists with the data transmission. In some embodiments, the method 1400 includes, in response to determining that the half duplex problem exists with the data transmission, retransmitting 1406 the data transmission.

In certain embodiments, the device comprises a scheduling user equipment, and the scheduling user equipment belongs to a destination group. In some embodiments, the device comprises a non-scheduling user equipment.

In one embodiment, a method comprises: transmitting, to a device, configuration information on a transmission resource, wherein the configuration information comprises: resource information for a data transmission; a request for feedback; and a configuration message indicating configuration of a feedback resource; monitoring for feedback from the device on the feedback resource; and transmitting the data transmission after the monitoring for feedback on the feedback resource.

In certain embodiments, a gap time period in terms of time domain symbols occurs between a time domain symbol in which the configuration information is transmitted and a time domain symbol in which the feedback is received.

In some embodiments, the feedback resource is received in a time domain symbol directly after a time domain symbol in which the configuration information is transmitted.

In various embodiments, the feedback indicates whether there is a half duplex problem detection, a resource collision, or a combination thereof.

In one embodiment, the configuration of the feedback resource comprises information indicating a time domain symbol for the feedback.

In certain embodiments, the feedback resource comprises orthogonal frequency division multiplexed symbols configured as blank symbols.

In some embodiments, no transmissions are made on the blank symbol except the feedback transmission made by the device.

In various embodiments, the method further comprises selecting the transmission resource and the feedback resource from a resource pool.

In one embodiment, transmitting the configuration information comprises transmitting the configuration information within sidelink control information, transmitting the configuration information using a radio resource control message, receiving the configuration message as part of downlink control information, receiving the configuration message as part of radio resource control information, or some combination thereof.

In certain embodiments, the feedback resource comprises a common feedback resource or a dedicated feedback resource.

In some embodiments, the configuration information comprises an indication of a half duplex problem detection.

In various embodiments, transmitting the data transmission comprises transmitting the data transmission based on the feedback corresponding to a half duplex problem detection.

In one embodiment, transmitting the data transmission based on the feedback corresponding to the half duplex problem detection comprises transmitting the data transmission based on an indicated time slot in a feedback message or based on a random back off timer.

In certain embodiments, the method further comprises, in response to monitoring for the feedback on the feedback resource resulting in not detecting the feedback, transmitting the data transmission based on a random back off timer, a remaining packet delay budget, a priority, or a combination thereof.

In some embodiments, transmitting the data transmission based on the random back off timer, the remaining packet delay budget, the priority, or the combination thereof comprises transmitting the data transmission in a prior determined time slot, or transmitting the data transmission in a time slot determined based on a random back off timer.

In various embodiments, the device comprises a scheduling user equipment, and the scheduling user equipment belongs to a destination group.

In one embodiment, the device comprises one or more non-scheduling user equipments.

In certain embodiments, the data transmission occurs in a slot after the transmission resource and the feedback resource.

In some embodiments, the feedback resource is used to carry a negative acknowledgment that indicates detection of a potential half duplex problem.

In various embodiments, the feedback indicates that there is not a half duplex problem detected.

In one embodiment, the method further comprises transmitting a second data transmission on a second feedback resource.

In one embodiment, an apparatus comprises: a transmitter that transmits, to a device, configuration information on a transmission resource, wherein the configuration information comprises: resource information for a data transmission; a request for feedback; and a configuration message indicating configuration of a feedback resource; and a processor that monitors for feedback from the device on the feedback resource; wherein the transmitter transmits the data transmission after the monitoring for feedback on the feedback resource.

In certain embodiments, a gap time period in terms of time domain symbols occurs between a time domain symbol in which the configuration information is transmitted and a time domain symbol in which the feedback is received.

In some embodiments, the feedback resource is received in a time domain symbol directly after a time domain symbol in which the configuration information is transmitted.

In various embodiments, the feedback indicates whether there is a half duplex problem detection, a resource collision, or a combination thereof.

In one embodiment, the configuration of the feedback resource comprises information indicating a time domain symbol for the feedback.

In certain embodiments, the feedback resource comprises orthogonal frequency division multiplexed symbols configured as blank symbols.

In some embodiments, no transmissions are made on the blank symbol except the feedback transmission made by the device.

In various embodiments, the processor selects the transmission resource and the feedback resource from a resource pool.

In one embodiment, the apparatus further comprises a receiver, wherein the transmitter transmitting the configuration information comprises the transmitter transmitting the configuration information within sidelink control information, the transmitter transmitting the configuration information using a radio resource control message, the receiver receiving the configuration message as part of downlink control information, the receiver receiving the configuration message as part of radio resource control information, or some combination thereof.

In certain embodiments, the feedback resource comprises a common feedback resource or a dedicated feedback resource.

In some embodiments, the configuration information comprises an indication of a half duplex problem detection.

In various embodiments, the transmitter transmitting the data transmission comprises the transmitter transmitting the data transmission based on the feedback corresponding to a half duplex problem detection.

In one embodiment, the transmitter transmitting the data transmission based on the feedback corresponding to the half duplex problem detection comprises the transmitter transmitting the data transmission based on an indicated time slot in a feedback message or based on a random back off timer.

In certain embodiments, in response to the processor monitoring for the feedback on the feedback resource resulting in not detecting the feedback, the transmitter transmits the data transmission based on a random back off timer, a remaining packet delay budget, a priority, or a combination thereof.

In some embodiments, the transmitter transmitting the data transmission based on the random back off timer, the remaining packet delay budget, the priority, or the combination thereof comprises the transmitter transmitting the data transmission in a prior determined time slot, or transmitting the data transmission in a time slot determined based on a random back off timer.

In various embodiments, the device comprises a scheduling user equipment, and the scheduling user equipment belongs to a destination group.

In one embodiment, the device comprises one or more non-scheduling user equipments.

In certain embodiments, the data transmission occurs in a slot after the transmission resource and the feedback resource.

In some embodiments, the feedback resource is used to carry a negative acknowledgment that indicates detection of a potential half duplex problem.

In various embodiments, the feedback indicates that there is not a half duplex problem detected.

In one embodiment, the transmitter transmits a second data transmission on a second feedback resource.

In one embodiment, a method comprises: receiving, at a device, configuration information on a reception resource, wherein the configuration information comprises: resource information for a data transmission; a request for feedback; and a configuration message indicating configuration of a feedback resource; determining whether to transmit feedback on the feedback resource; in response to determining to transmit the feedback on the feedback resource, transmitting the feedback from the device on the feedback resource; and receiving the data transmission after the feedback resource.

In certain embodiments, a gap time period in terms of time domain symbols occurs between a time domain symbol in which the configuration information is transmitted and a time domain symbol in which the feedback is received.

In some embodiments, the feedback resource is received in a time domain symbol directly after a time domain symbol in which the configuration information is transmitted.

In various embodiments, the feedback indicates whether there is a half duplex problem detection, a resource collision, or a combination thereof.

In one embodiment, the configuration of the feedback resource comprises information indicating a time domain symbol for the feedback.

In certain embodiments, the feedback resource comprises orthogonal frequency division multiplexed symbols configured as blank symbols.

In some embodiments, no transmissions are made on the blank symbol except the feedback transmission made by the device.

In various embodiments, the transmission resource and the feedback resource are selected from a resource pool.

In one embodiment, receiving the configuration information comprises receiving the configuration information within sidelink control information, receiving the configuration information using a radio resource control message, receiving the configuration message as part of downlink control information, receiving the configuration message as part of radio resource control information, or some combination thereof.

In certain embodiments, the feedback resource comprises a common feedback resource or a dedicated feedback resource.

In some embodiments, the configuration information comprises an indication of a half duplex problem detection.

In various embodiments, receiving the data transmission comprises receiving the data transmission based on the feedback corresponding to a half duplex problem detection.

In one embodiment, receiving the data transmission based on the feedback corresponding to the half duplex problem detection comprises receiving the data transmission based on an indicated time slot in a feedback message or based on a random back off timer.

In certain embodiments, the method further comprises, in response to determining not to transmit the feedback on the feedback resource, receiving the data transmission based on a random back off timer, a remaining packet delay budget, a priority, or a combination thereof.

In some embodiments, receiving the data transmission based on the random back off timer, the remaining packet delay budget, the priority, or the combination thereof comprises receiving the data transmission in a prior determined time slot, or receiving the data transmission in a time slot determined based on a random back off timer.

In various embodiments, the device comprises a scheduling user equipment, and the scheduling user equipment belongs to a destination group.

In one embodiment, the device comprises one or more non-scheduling user equipments.

In certain embodiments, the data transmission occurs in a slot after the transmission resource and the feedback resource.

In some embodiments, the feedback resource is used to carry a negative acknowledgment that indicates detection of a potential half duplex problem.

In one embodiment, an apparatus comprises: a receiver that receives configuration information on a reception resource, wherein the configuration information comprises: resource information for a data transmission; a request for feedback; and a configuration message indicating configuration of a feedback resource; a processor that determines whether to transmit feedback on the feedback resource; and a transmitter that, in response to the processor determining to transmit the feedback on the feedback resource, transmits the feedback from the apparatus on the feedback resource; wherein the receiver receives the data transmission after the feedback resource.

In certain embodiments, a gap time period in terms of time domain symbols occurs between a time domain symbol in which the configuration information is transmitted and a time domain symbol in which the feedback is received.

In some embodiments, the feedback resource is received in a time domain symbol directly after a time domain symbol in which the configuration information is transmitted.

In various embodiments, the feedback indicates whether there is a half duplex problem detection, a resource collision, or a combination thereof.

In one embodiment, the configuration of the feedback resource comprises information indicating a time domain symbol for the feedback.

In certain embodiments, the feedback resource comprises orthogonal frequency division multiplexed symbols configured as blank symbols.

In some embodiments, no transmissions are made on the blank symbol except the feedback transmission made by the apparatus.

In various embodiments, the transmission resource and the feedback resource are selected from a resource pool.

In one embodiment, the receiver receiving the configuration information comprises the receiver receiving the configuration information within sidelink control information, the receiver receiving the configuration information using a radio resource control message, the receiver receiving the configuration message as part of downlink control information, the receiver receiving the configuration message as part of radio resource control information, or some combination thereof.

In certain embodiments, the feedback resource comprises a common feedback resource or a dedicated feedback resource.

In some embodiments, the configuration information comprises an indication of a half duplex problem detection.

In various embodiments, the receiver receiving the data transmission comprises the receiver receiving the data transmission based on the feedback corresponding to a half duplex problem detection.

In one embodiment, the receiver receiving the data transmission based on the feedback corresponding to the half duplex problem detection comprises the receiver receiving the data transmission based on an indicated time slot in a feedback message or based on a random back off timer.

In certain embodiments, in response to determining not to transmit the feedback on the feedback resource, the receiver receives the data transmission based on a random back off timer, a remaining packet delay budget, a priority, or a combination thereof.

In some embodiments, the receiver receiving the data transmission based on the random back off timer, the remaining packet delay budget, the priority, or the combination thereof comprises the receiver receiving the data transmission in a prior determined time slot, or receiving the data transmission in a time slot determined based on a random back off timer.

In various embodiments, the apparatus comprises a scheduling user equipment, and the scheduling user equipment belongs to a destination group.

In one embodiment, the apparatus comprises one or more non-scheduling user equipments.

In certain embodiments, the data transmission occurs in a slot after the transmission resource and the feedback resource.

In some embodiments, the feedback resource is used to carry a negative acknowledgment that indicates detection of a potential half duplex problem.

In one embodiment, a method comprises: receiving, at a device, a data transmission via sidelink transmission; determining whether a half duplex problem exists with the data transmission; and in response to determining that the half duplex problem exists with the data transmission, retransmitting the data transmission.

In certain embodiments, the device comprises a scheduling user equipment, and the scheduling user equipment belongs to a destination group.

In some embodiments, the device comprises a non-scheduling user equipment.

In one embodiment, an apparatus comprises: a receiver that receives a data transmission via sidelink transmission; a processor that determines whether a half duplex problem exists with the data transmission; and a transmitter that, in response to determining that the half duplex problem exists with the data transmission, retransmits the data transmission.

In certain embodiments, the apparatus comprises a scheduling user equipment, and the scheduling user equipment belongs to a destination group.

In some embodiments, the apparatus comprises a non-scheduling user equipment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of sidelink communication performed by a user equipment (UE), the method comprising:
transmitting sidelink control information (SCI) on a first resource of a physical sidelink control channel (PSCCH), wherein the SCI comprises information indicating at least one future resource reserved for at least one future transmission;
receiving first feedback comprising a negative acknowledgement (NACK) on a first feedback resource, wherein the first feedback indicates a half duplex problem, or a resource collision, or a combination thereof, associated with the first resource of the PSCCH, or the at least one future resource, or a combination thereof even if sidelink data is successfully decoded for the first resource of the PSCCH; and
transmitting or refrain from transmitting the at least one future transmission based on the first feedback.

2. The method of claim 1, wherein the first feedback resource is configured to receive information on a physical sidelink feedback channel (PSFCH).

3. The method of claim 1, wherein a second feedback resource is configured to receive information on a physical sidelink feedback channel (PSFCH), and second feedback on the second feedback resource comprises feedback indicating detection of the half duplex problem, the resource collision, or the combination thereof for future resources reserved by the SCI.

4. The method of claim 3, wherein the second feedback comprises a negative acknowledgment (NACK) in response to there being the half duplex problem, the resource collision or the combination thereof for the at least one future resource.

5. The method of claim 3, further comprising, in response to detecting an expected resource conflict by monitoring the second feedback resource, reselecting a reserved resource for a future transmission.

6. The method of claim 1, wherein the first feedback resource is configured to receive information on a physical sidelink feedback channel (PSFCH).

7. The method of claim 1, wherein half duplex detection is explicitly requested in the SCI or implicitly derived from a priority of a packet.

8. The method of claim 1, wherein half duplex detection is configured at a relay UE or any group member UE.

9. A user equipment (UE) for performing sidelink communication, the UE comprising:
at least one memory; and
at least one processor coupled with the at least one memory and configured to cause the UE to:
transmit sidelink control information (SCI) on a first resource of a physical sidelink control channel (PSCCH), wherein the SCI comprises information indicating at least one future resource reserved for at least one future transmission;
receive first feedback comprising a negative acknowledgement (NACK) on a first feedback resource, wherein the first feedback indicates a half duplex problem, or a resource collision, or a combination thereof, associated with the first resource of the PSCCH, or the at least one future resource, or a combination thereof even if sidelink data is successfully decoded for the first resource of the PSCCH; and transmit or refrain from transmitting the at least one future transmission based on the first feedback.

10. The UE of claim 9, wherein the first feedback resource is configured to receive information on a physical sidelink feedback channel (PSFCH).

11. The UE of claim 9, wherein a second feedback resource is configured to receive information on a physical sidelink feedback channel (PSFCH), and second feedback on the second feedback resource comprises feedback indicating detection of the half duplex problem, the resource collision, or the combination thereof for future resources reserved by the SCI.

12. The UE of claim 11, wherein the second feedback comprises a negative acknowledgment (NACK) in response to there being the half duplex problem, the resource collision or the combination thereof for the at least one future resource.

13. The UE of claim 11, wherein the at least one processor is configured to cause the UE to, in response to detecting an expected resource conflict by monitoring the second feedback resource, reselect a reserved resource for a future transmission.

14. A method of sidelink communication performed by a user equipment (UE), the method comprising:

receiving sidelink control information (SCI) on a first resource of a physical sidelink control channel (PSCCH), wherein the SCI comprises information indicating at least one future resource reserved for at least one future transmission;

transmitting feedback comprising a negative acknowledgement (NACK) on a feedback resource, wherein the feedback indicates a half duplex problem, or a resource collision, or a combination thereof for the first resource of the PSCCH, or the at least one future resource, or a combination thereof even if sidelink data is successfully decoded for the first resource of the PSCCH; and retransmitting data in response to detection of the half duplex problem, or the resource collision, or the combination thereof.

15. The method of claim 14, further comprising detecting the half duplex problem in response to:

receiving at least one SCI transmission from group member UEs in orthogonal frequency division multiplexing symbols of a time slot; and checking destination group identifiers, resources selected for sidelink data transmission by the group member UEs from their SCI, or a combination thereof.

16. The method of claim 15, wherein the half duplex problem is detected in response to a pair of destination group identifiers of the destination group identifiers being identical, a pair of resources of the resources selected for sidelink data transmission by the group member UEs occupying the same time slot, or a combination thereof.

17. The method of claim 15, wherein the half duplex problem is not detected in response to a pair of destination group identifiers of the destination group identifiers not being identical, a pair of resources of the resources selected for sidelink data transmission by the group member UEs not occupying the same time slot, or a combination thereof.

18. The method of claim 15, wherein the half duplex problem is detected in response to a pair of destination group identifiers of the destination group identifiers not being identical and a pair of resources of the resources selected for sidelink data transmission by the group member UEs occupying the same time slot, or a combination thereof.

19. A user equipment (UE) for performing sidelink communication, the UE comprising:

at least one memory; and at least one processor coupled with the at least one memory and configured to cause the UE to:

receive sidelink control information (SCI) on a first resource of a physical sidelink control channel (PSCCH), wherein the SCI comprises information indicating at least one future resource reserved for at least one future transmission;

transmit feedback comprising a negative acknowledgement (NACK) on a feedback resource, wherein the feedback indicates a half duplex problem, or a resource collision, or a combination thereof for the first resource of the PSCCH, or the at least one future resource, or a combination thereof even if sidelink data is successfully decoded for the first resource of the PSCCH; and retransmit data on the first resource in response to detection of the half duplex problem, or the resource collision, or the combination thereof.

\* \* \* \* \*